United States Patent Office 3,151,026
Patented Sept. 29, 1964

3,151,026
4-[2'-(β-MORPHOLYLETHOXYCARBONYL)-PHEN-YLAMINO]-7-CHLORO-QUINOLINE
André Allais and Pierre Girault, Paris, France, assignors to Roussel-UCLAF, S.A., Paris, France, a corporation of France
No Drawing. Filed Apr. 29, 1963, Ser. No. 276,163
Claims priority, application France, May 8, 1962, 896,833
6 Claims. (Cl. 167—65)

The invention relates to the novel products, 4-[2'-(β-morpholylethoxycarbonyl) - phenylamino] - 7 - chloroquinoline and its non-toxic, pharmaceutically acceptable acid addition salts and to a novel process of preparing the said products. The invention also relates to novel anti-inflammatory compositions.

It is an object of the invention to provide the novel products, 4-[2'-(β - morpholylethoxycarbonyl) - phenylamino]-7-chloro-quinoline and its non-toxic, pharmaceutically acceptable acid addition salts.

It is another object of the invention to provide a novel process for the preparation of 4-[2'-(β-morpholylethoxycarbonyl)-phenylamino]-7-chloro-quinoline and its non-toxic pharmaceutically acceptable acid addition salts.

It is a further object of the invention to provide novel anti-inflammatory compositions.

These and other objects and advantages of the invention will become obvious from the following detailed description.

The novel quinolines of the invention are selected from the group consisting of 4-[2'-(β-morpholylethoxycarbonyl)-phenylamino]-7-chloro - quinoline having the formula

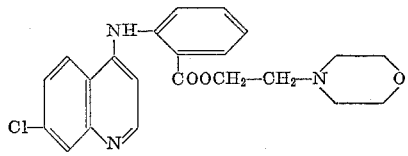

and its non-toxic, pharmaceutically acceptable acid addition salts. The acid addition salts may be derived from pharmaceutically acceptable mineral acids and organic acids, such as sulfuric acid, hydrochloric acid, citric acid, tartaric acid, acetic acid, etc. The said novel quinolines are particularly useful for the treatment of inflammatory and painful manifestations.

The novel process of the invention for the preparation of 4-[2'-(β-morpholylethoxycarbonyl)-phenylamino] - 7-chloro-quinoline and its non-toxic, pharmaceutically acceptable acid addition salts comprises subjecting a 4-(2'-carbo-lower alkoxyphenylamino)-7-chloro - quinoline to transesterification with β-morpholino-ethanol in the presence of an alkali metal to form 4-[2'-(β-morpholylethoxycarbonyl)-phenylamino]-7-chloro-quinoline which can then be reacted with a mineral acid or organic acid to form the desired acid addition salt. The preferred starting material is 4-(2'-carbomethoxyphenylamino)-7-chloro-quinoline. The reaction scheme is illustrated in Table I.

TABLE I

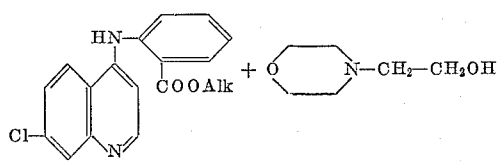

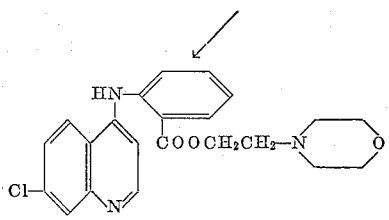

The novel anti-inflammatory compositions of the invention are comprised of a quinoline compound selected from the group consisting of 4-[2'-(β-morpholylethoxycarbonyl)-phenylamino]-7-chloro-quinoline and its non-toxic, pharmaceutically acceptable acid addition salts and a major amount of an inert pharmaceutical carrier. The dosage is controlled between 0.05 to 0.200 gm. per dose and 0.100 to 1.0 gm. per day in the adult depending upon the method of administration.

The 4-(2'-carbo-lower-alkoxyphenylamino)-7 - chloro-quinolines used as the starting materials in the process are prepared according to the process described in applicants copending, commonly assigned U.S. application Serial No. 207,388, filed July 3, 1962, which comprises condensing 2-carbo-lower-alkoxyaniline with 4,7-dichloroquinoline in the presence of a mineral acid to form the acid salt of 4-(2'-carbo-lower-alkoxyphenylamino)-7-chloro-quinoline and neutralizing the latter to form the free base.

In the following example there are described several preferred embodiments to illustrate the invention. However, it should be understood that the invention is not intended to be limited to the specific embodiments.

*Example*

PREPARATION OF 4-[2'-(β-MORPHOLYLETHOXYCAR-BONYL)-PHENYLAMINO]-7-CHLORO-QUINOLINE 75 cc. of β-morpholino-ethanol were introduced into a 3-necked balloon flask having a reflux condenser and then 0.06 gm. of sodium were introduced under a nitrogen atmosphere. The mixture was heated to 80–85° C. until complete solution occurred and then 18 gm. of 4-[2'-carbomethoxyphenylamino]-7-chloro - quinoline were introduced. The mixture was carefully homogenized and heated to 125° C. The heating was maintained for a period of 3 hours and the freed methanol was distilled from the mixture progressively. At the end of 3 hours, the mixture was allowed to cool and then it was poured into 750 cc. of water. 4-[2'-(β-morpholylethoxycarbonyl)-phenylamino]-7-chloro-quinoline crystallized in fine needles after icing. The crystals were separated by filtration, vacuum filtered, washed with water by repeated trituration and then dried under vacuum.

The raw product was dissolved in 450 cc. of hot isopropyl ether and the solution was decolorized by the addition of activated carbon. The solution was filtered while hot and then brought to dryness by distillation. The residue was dissolved in 30 cc. of boiling methanol from which 4-[2'-(β-morpholylethoxycarbonyl)-phenylamino]-7-chloro-quinoline crystallized after cooling in a refrigerator overnight. The product was separated and vacuum filtered and was obtained in the form of voluminous prisms solvated with methanol. The solvate was redissolved in 40 cc. of isopropyl ether at reflux. By cooling, the solvated product crystallized and was recovered by filtration, washed with isopropyl ether and dried under vacuum to obtain 11.5 gm. (48% yield) of 4-[2'-(β-morpholylethoxycarbonyl) - phenylamino] - 7-chloro-quinoline having a melting point of 80° C.

This product occurred in the form of a solid compound having a slight yellow tint. The product crystallized in prisms. It was soluble in alcohol, ether, acetone, benzene, chloroform and dilute aqueous acids, slightly soluble in oils and insoluble in dilute aqueous alkalis, water and aqueous alcohols.

This compound is not described in the literature.

*Analysis.*—$C_{22}H_{22}O_3N_3Cl$. Calculated: C, 64.15%; H, 5.38%; N, 10.2%; Cl, 8.6%. Found: C, 64.1%; H, 5.3%; N, 10.2%; Cl, 8.5%.

The starting compound, 4-(2'-carbomethoxyphenylamino)-7-chloro-quinoline, was prepared according to the process described in commonly assigned copending U.S. patent application Serial No. 207,388, filed July 3, 1962.

4-[2'-(β-morpholylethoxycarbonyl)-phenylamino] - 7-chloro-quinoline, dissolved in a mixture of ethanol and ether (1:1), was transformed by the action of an ethanolic solution of hydrochloric acid into the corresponding dihydrochloride salt. This salt had a melting point of 228–230° C. and was soluble in alcohol, slightly soluble in water, and insoluble in ether, acetone, benzene and chloroform.

*Analysis.*—$C_{22}H_{24}O_3N_3Cl_3$; molecular weight=484.2. Calculated: C, 54.5%; H, 4.99%; N, 8.66%; Cl, 21.94%. Found: C, 54.5%; H, 5.0%; N, 8.4%; Cl, 21.8%.

This compound is not described in the literature.

Various modifications of the process of the invention may be made without departing from the spirit or scope thereof, and it is to be understood that the invention is intended to be limited only as defined in the appended claims.

We claim:
1. A compound selected from the group consisting of 4-[2'-(β-morpholylethoxycarbonyl) - phenylamino] - 7-chloro-quinoline having the formula

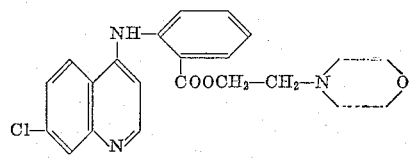

and its non-toxic, pharmaceutically acceptable acid addition salts.

2. 4-[2'-(β-morpholylethoxycarbonyl) - phenylamino]-7-chloro-quinoline.

3. The dihydrochloride salt of 4-[2'-(β-morpholylethoxycarbonyl)-phenylamino]-7-chloro-quinoline.

4. An anti-inflammatory composition comprising 0.05 to 0.200 gm. of a quinoline compound selected from the group consisting of 4-[2'-(β - morpholylethoxycarbonyl)-phenylamino]-7-chloro-quinoline and its non-toxic, pharmaceutically acceptable acid addition salts and a major amount of an inert pharmaceutical carrier.

5. An anti-inflammatory composition comprising 0.05 to 0.200 gm. of 4-[2'-(β-morpholylethoxycarbonyl)-phenylamino-7-chloro-quinoline and a major amount of an inert pharmaceutical carrier.

6. An anti-inflammatory composition comprising 0.05 to 0.200 gm. of the dihydrochloride salt of 4-[2'-(β-morpholylethoxycarbonyl)-phenylamino]-7-chloro - quinoline and a major amount of an inert pharmaceutical carrier.

References Cited in the file of this patent
UNITED STATES PATENTS

| | | |
|---|---|---|
| 3,094,532 | Blicke et al. | June 18, 1963 |
| 3,120,541 | Denss et al. | Feb. 4, 1964 |